(12) United States Patent
Ohta

(10) Patent No.: US 7,220,216 B2
(45) Date of Patent: May 22, 2007

(54) LOCK-UP CLUTCH CONTROL DEVICE

(75) Inventor: Yuuki Ohta, Okazaki (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 161 days.

(21) Appl. No.: 10/972,692

(22) Filed: Oct. 26, 2004

(65) Prior Publication Data
US 2005/0096182 A1    May 5, 2005

(30) Foreign Application Priority Data
Oct. 29, 2003  (JP) ............... 2003-368994
Oct. 29, 2003  (JP) ............... 2003-368995

(51) Int. Cl.
F16H 45/02   (2006.01)
(52) U.S. Cl. .................... 477/169; 477/175
(58) Field of Classification Search ........... 477/166, 477/169, 175
See application file for complete search history.

(56) References Cited

U.S. PATENT DOCUMENTS 5,112,280 A * 5/1992 Sato ..................... 474/18
5,480,363 A * 1/1996 Matsubara et al. ........... 477/63
5,573,473 A * 11/1996 Asayama et al. ............. 477/63
5,669,848 A * 9/1997 Kondo et al. ................ 477/64
5,755,638 A * 5/1998 Suzuki ........................ 477/62
6,974,009 B2 * 12/2005 Hoshiya et al. ............ 192/3.63

FOREIGN PATENT DOCUMENTS

| JP | 7-239025 | 9/1995 |
| JP | 2827691 | 9/1998 |
| JP | 2003-269603 | * 9/2003 |

* cited by examiner

*Primary Examiner*—Ha Ho
(74) *Attorney, Agent, or Firm*—Buchanan Ingersoll & Rooney PC (57) ABSTRACT

A lock-up clutch control device for controlling a lock-up clutch mechanism provided to a torque converter is including an estimator means for estimating a contact timing of a friction material included in the lock-up clutch mechanism during a driven state based on an engine rotational speed change when condition of the lock-up clutch mechanism is changed from a disengaging state to an engaging state.

16 Claims, 7 Drawing Sheets

LOCK-UP CLUTCH CONTROL DEVICE

CROSS REFERENCE TO RELATED APPLICATIONS

This application is based on and claims priority under 35 U.S.C. § 119 to Japanese Patent Application 2003-368994, filed on Oct. 29, 2003 and Japanese Patent Application 2003-368995, filed on Oct. 29, 2003, the entire content of which is incorporated herein by reference.

FIELD OF THE INVENTION

This invention generally relates to a lock-up clutch control device. More particularly, the present invention pertains to the lock-up clutch control device for controlling a lock-up clutch mechanism provided to a torque converter.

BACKGROUND

Recently, several methods have been known as a lock-up clutch control device for an automatic transmission of a vehicle. For example, as disclosed in JP07-239025A2, to carry out quick lock-up operation with restraining shock, a lock-up clutch control device judges whether a dead zone of controlling in loss-stroke zone of the lock-up clutch (friction material) or a controllable zone that the lock-up clutch is in contacting state by means of an estimation system of a clutch system. In other words, this estimation system estimates contacting torque (divided torque) of the lock-up clutch, then judges contact timing of the lock-up clutch (namely an end point of a loss stroke zone) on the basis of estimated contacting torque.

In the disclosed lock-up clutch control device, to estimate contacting torque of the lock-up clutch, the disclosed lock-up clutch control device refers engine torque, friction coefficient μ of the friction material, performance (specification) of a torque converter and so on. Therefore, when variation of the engine torque or change of the friction coefficient by means of aging or temperature change exists, it may be difficult to judge the end point of the loss-stroke zone (contact timing of the lock-up clutch) exactly.

Therefore, a need exists for a lock-up clutch control device to estimate adequate contact timing of a friction material.

On the other hand, another example of a lock-up clutch control device has been disclosed (JP2827691B2). This lock-up clutch control device executes learning control of output wave form (precharge control wave form) in precharge controlling of hydraulic pressure to carry out quick lock-up operation with restraining shock.

In the disclosed lock-up clutch control device, the precharge wave form is defined as a combination of a first period wave form in which a pressure in the order of maximum pressure is kept as a control value of lock-up hydraulic pressure for precharge control and a second period wave form in which ramp control pressure is set after the first period with a predetermined time inclination, then lock-up operation pressure is precharged.

Therefore, since the second period wave form includes ramp inclination and shock at contacting is different between a case that the end point of the loss-stroke zone is provided at initial stage of ramp control and a case that the end point of the loss-stroke zone is provided after passing the predetermined time of ramp control. For example, if ramp initial pressure (namely, the second period wave form) is learned based on the shock at contacting, it may be difficult to define degree of compensation.

Therefore, a need exists for a lock-up clutch control device to execute adequate earning of a precharge control wave form in precharge control against loss-stroke.

SUMMARY OF THE INVENTION

According to an aspect of the present invention, a lock-up clutch control device for controlling a lock-up clutch mechanism provided to a torque converter includes an estimation means for estimating a contact timing of a friction material included in the lock-up clutch mechanism during a driven state based on an engine rotational speed change when condition of the lock-up clutch mechanism is changed from a disengaging state to an engaging state.

According to another aspect of the present invention, a lock-up clutch control device for controlling a lock-up clutch mechanism provided to a torque converter includes an engine rotational speed detection means for detecting an engine rotational speed, a turbine rotational speed detection means for detecting a turbine rotational speed, a condition detection means for detecting a driven state based on the detected engine rotational speed and the turbine rotational speed, an engine rotational speed change detection means for detecting an engine rotational speed change based on the detected engine rotational speed, and an estimation means for estimating a contact timing of a friction material included in the lock-up clutch mechanism during the driven state based on the engine rotational speed change when condition of the lock-up clutch mechanism is changed from a disengaging state to an engaging state.

It is preferable that the estimation means estimates the contact timing of the friction material based on comparison between the change of the engine rotational speed and a predetermined value and comparison between a continuing time period of increasing of the engine rotational speed change and a predetermined time period.

It is preferable that a lock-up clutch control device further includes a continuing time period detection means for detecting the continuing time period of nondecreasing of the engine rotational speed change, wherein the estimation means estimates the contact timing of the friction material from a time calculated by subtracting the continuing time period detected by the continuing time period detection means from a time wherein the engine rotational speed change exceeds the predetermined value and continuing time period of increasing of the engine rotational speed change exceeds the predetermined time period.

It is preferable that the estimation means estimates that the friction material is not on contact timing when the engine rotational speed change keeps an invariable state with exceeding the predetermined time period.

It is preferable that the engine rotational speed detection means detects the engine rotational speed through a low pass filter calculation.

It is preferable that the change of the engine rotational speed detection means detects the engine rotational speed change through a low pass filter calculation.

It is preferable that a lock-up clutch control device further includes a precharge control means for executing a precharge control of supplying hydraulic pressure for controlling movement of a lock-up piston by outputting a precharge wave form including a first period wave form set to the vicinity of a maximum value and a second period wave form set to smaller value than the value of the first period wave form and a learning control means for controlling the precharge wave form based on a contacting shock of the friction material calculated from the engine rotational speed change, where the second period wave form of the precharge wave form is kept at a constant value.

It is preferable that a lock-up clutch control device further includes an adjusting means for incremental adjusting of the constant value set to the second period wave form after stopping the learning control of the precharge control when the friction material becomes contacting state after an end time of the precharge control.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

A preferred embodiment of the present invention will be described hereinbelow in detail with reference to the accompanying drawings.

(First Embodiment)

Figure 1:
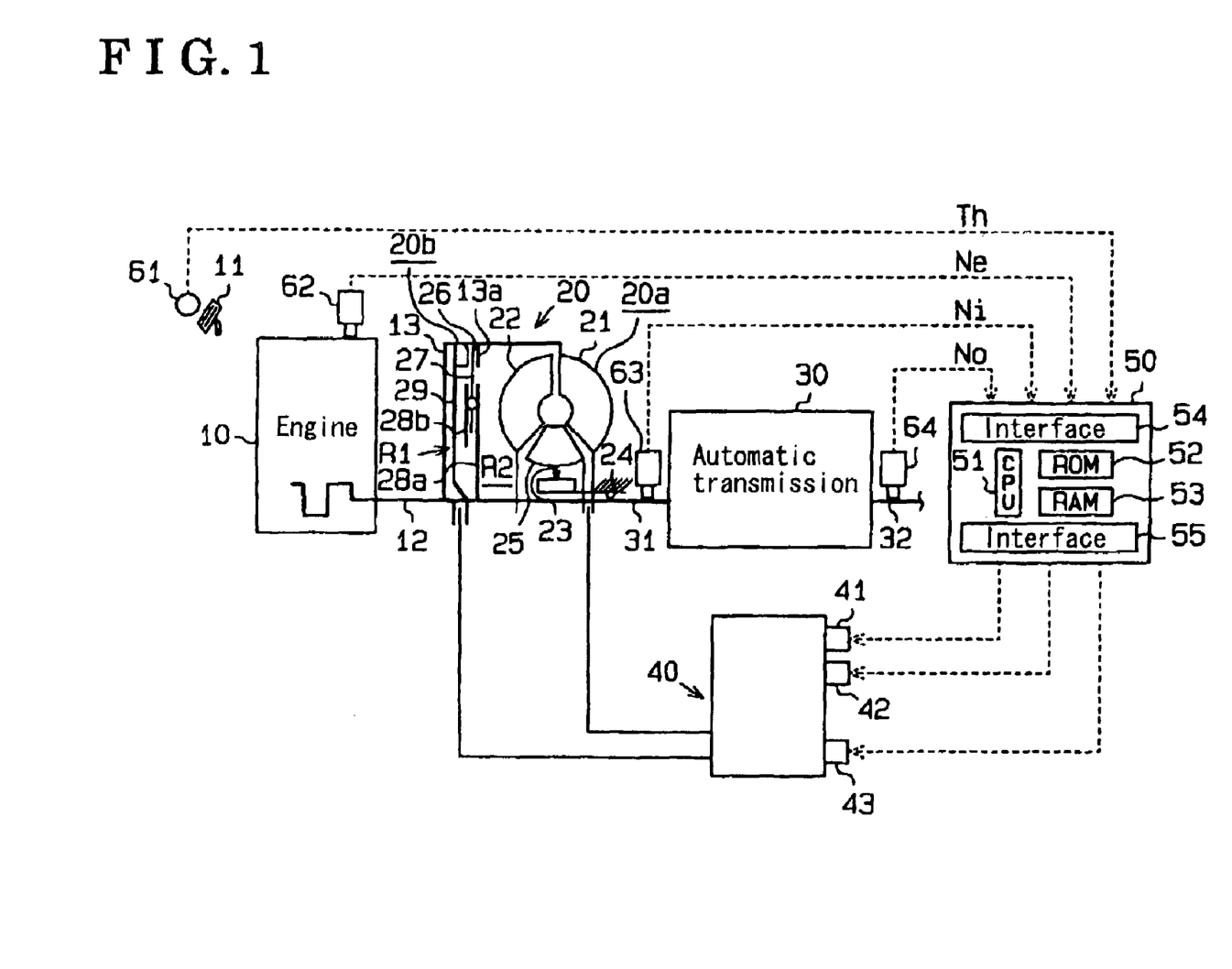
FIG. 1 is a schematic view illustrating power train according to an embodiment of the present invention.

FIG. 1 is a schematic view showing a condition that a power train according to a first embodiment of the present invention is mounted to a vehicle. The vehicle includes an engine 10, a torque converter 20 with a lock-up clutch, an automatic transmission 30 including a plural set of planetary gear unit and so on, a hydraulic pressure control circuit 40 for controlling hydraulic pressure supplied to the torque converter 20 and the automatic transmission 30, and a electronic control unit (ECU) 50 for supplying control signal to the hydraulic control circuit 40. For example, a motive energy (engine torque) generated at the engine 10 varied with pressing condition of an accelerator pedal 11 is transmitted to drive wheels (not shown) via the torque converter 20, the automatic transmission 30 and a differential (not shown). Oh the other hand, when the accelerator pedal 11 is released from pressed state, a motive energy of drive wheels (inertia force) is transmitted to the engine 10 via the differential (not shown), the automatic transmission 30, and the torque converter 20. The latter state is defined as a driven state.

Figure 2:
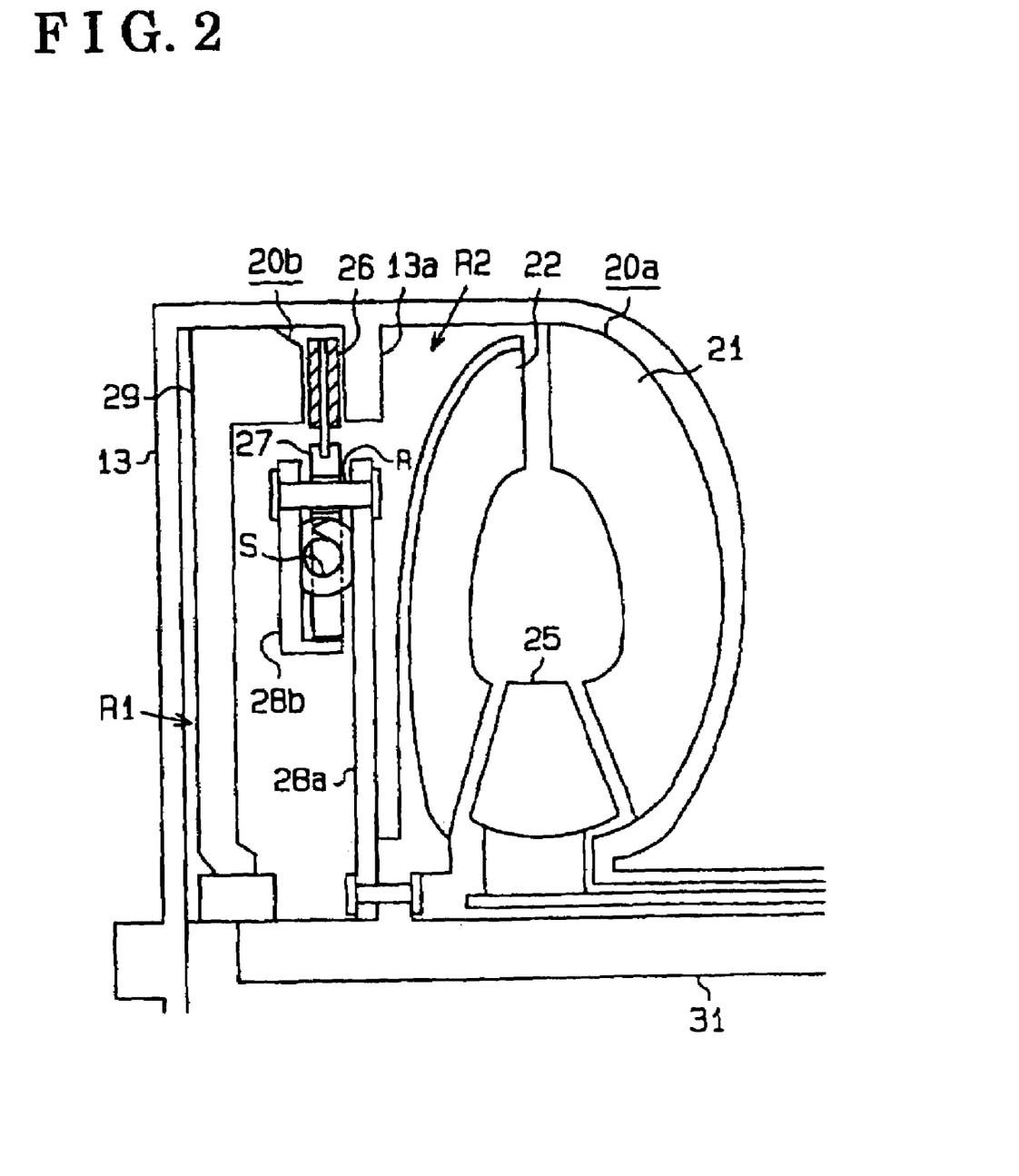
FIG. 2 is a cross sectional view illustrating a lock-up clutch mechanism according to an embodiment of the present invention.

The torque converter 20 includes a hydraulic transmission mechanism 20a and a lock-up clutch mechanism 20b connected in parallel with the hydraulic transmission mechanism 20a. The hydraulic transmission mechanism 20a includes a pump impeller 21 rigidly connected to a crank shaft 12 of the engine 10 via a connecting member 13 including a front cover, a turbine impeller 22 rigidly connected to an input shaft 31 of the automatic transmission and rotatable by receiving fluid from the pump impeller 21, and a stator impeller 25 fixed to a housing 24 via a one-way clutch 23. In other wards, the connecting member 13 includes the pump impeller 21 integrally rotatably connected to the crank shaft 12 serving as an output shaft of the engine 10, and the input shaft 31 of the automatic transmission includes the turbine impeller 22 integrally rotatably connected to the drive wheels of the vehicle.

The lock-up clutch mechanism 20b includes a lock-up clutch 26 which serves as a friction material (namely, a ring shaped plate including friction material on each side) movably supported in axial direction, a drive plate 27 fixed to the lock-up clutch 26 at inner side of axial direction, a clutch opposed portion 13a integrally formed with the connecting member 13 and facing one side of the lock-up clutch 26, a first driven plate 28a integrally rotatably fixed to the input shaft 31 of the automatic transmission 30, a second driven plate 28b formed as ring type shape and fixed to the first driven plate 28a by a rivet R, a lock-up piston 29 which is movable in axial direction for pressing the lock-up clutch 26 to the clutch opposed portion 13a, and a plural coil spring S.

The coil spring S serves as a dumper mechanism for absorbing vibration and is provided in an elongated space formed between the first driven plate 28a and the second driven plate 28b. The plural coil spring S (and the elongated spaces) are provided at predetermined positions along circumference of the first driven plate 28a and the second driven plate 28b. The coil spring S is capable to provide rebound force between the drive plate 27 and the first driven plate 28a when torsion angle is generated between the drive plate 27 (the lock-up clutch 26) and the first driven plate 28a (the second driven plate 28b).

When hydraulic pressure in a first hydraulic chamber R1 defined between a lock-up piston 29 and the connecting member 13 becomes higher than hydraulic pressure in a second hydraulic chamber R2 defined by the lock-up clutch 26, the clutch opposed portion 13a, the first driven plate 28a and so on (namely, right side of the lock-up piston 29 in FIG. 2), the lock-up piston 29 presses the lock-up clutch 26 to the clutch opposed member 13a so as to contact the lock-up clutch 26 to the clutch opposed member 13a. This process is defined as engaging condition of the lock-up clutch mechanism 20b.

On the other hand, when hydraulic pressure in the second hydraulic chamber R2 becomes higher than hydraulic pressure in the first hydraulic chamber R1, the lock-up piston moves to separate the lock-up clutch 26 from the clutch opposed portion 13a. This process is defined to as disengaging (releasing) state of the lock-up clutch mechanism 20b.

The automatic transmission mechanism 30 includes the input shaft 31 and an output shaft 32 connected to the drive wheels of the vehicle via the deferential and so on. The automatic transmission 30 is constructed as known multi-stage planetary gear unit in which one of plural forward gear and reward gear is selected in accordance with a condition of plural hydraulic friction engagement device (whether engaging state or disengaging state for each), the input shaft 31 and the output shaft 32 are rotated in accordance with selected gear position.

The hydraulic control device 40 includes a first electromagnetic valve 41 and a second electromagnetic valve 42 operated to change on/off condition in accordance with signal from the electronic control unit 50, and selectively operate the hydraulic friction engagement device of the planetary gear unit by means of combination of on/off operation of these electromagnetic valves 41, 42.

In addition, to control engaging and disengaging state of the lock-up clutch mechanism 20b, the hydraulic control device 40 includes a third electromagnetic valve 43 for controlling hydraulic supplied to the first hydraulic chamber R1 and the second hydraulic chamber R2, respectively. When the lock-up clutch mechanism 20b is engaged, the third electromagnetic valve 43 supplies hydraulic to the first hydraulic chamber R1 in accordance with rock-up hydraulic pressure control value P (which will be explained later) transmitted from the electronic control unit 50, and supplies a certain amount of hydraulic to the second hydraulic chamber R2. In this condition, the differential pressure of hydraulic in the first hydraulic chamber R1 and the second hydraulic chamber R2 corresponds to an engagement pressure of the lock-up clutch 26 to the clutch opposed portion 13a.

The electronic control unit 50 is a micro computer including a CPU 51, a ROM 52, RAM 53, interfaces 54, 55 and so on. The electronic control unit 50 is connected to an accelerator switch 61, an engine rotational speed sensor 62, an input shaft rotational speed sensor 63 and an output shaft rotational speed sensor 64.

The accelerator switch 61 outputs a throttle signal Th which is set to on or off in accordance with whether the accelerator pedal 11 is operated (pressed) or not. The engine rotational speed sensor 62 detects rotational speed of the engine 10 and outputs an engine rotational speed Ne (which corresponds to rotational speed of the pump impeller 21). The input shaft rotational sensor 63 detects rotational speed of the input shaft 31 of the automatic transmission 30 and outputs an input shaft rotational speed Ni (which corresponds to rotational speed of the turbine impeller 22). The output shaft rotational speed sensor 64 detects rotational speed of the output shaft 32 of the automatic transmission 30 and outputs an output shaft rotational speed No.

The CPU 51 of the electronic control unit 50 executes signal processing in accordance with a program stored in the ROM 52 with storing function of the RAM 53 and executes controlling of the automatic transmission 30 and the lock-up clutch mechanism 20b. The CPU 51 controls each electromagnetic valves 41, 42, 43 via an interface 55.

Namely, in shift change controlling of the automatic transmission 30, the CPU 51 selects a transmission diagram corresponding to actual condition of the vehicle from a plural transmission diagram stored in the ROM 52 in advance. Then, the CPU 51 determines shift position based on opening of the accelerator and vehicle speed calculated from the output shaft rotational speed No with the selected transmission diagram and operate the first electromagnetic valve 41 and the second electromagnetic valve 42 to obtain the intended shift position.

To control the lock-up clutch mechanism 20b, the CPU 51 selects one of a plural control region prestored in the ROM 52 (namely lock-up off region, slipping region, and lock-up on region) according to actual condition of the vehicle. Accordingly, the lock-up on region is generally set at the driven state of the engine 10 in which the vehicle is in high speed operation or engine braking is used (for example, a vehicle is moving on a sloping road and the accelerator pedal 11 is not operated). Then, the CPU 51 operates the third electromagnetic valve 43 via the hydraulic control circuit 40 for controlling engaging or disengaging of the lock-up clutch mechanism 20b based on the selected control region.

Figure 3:
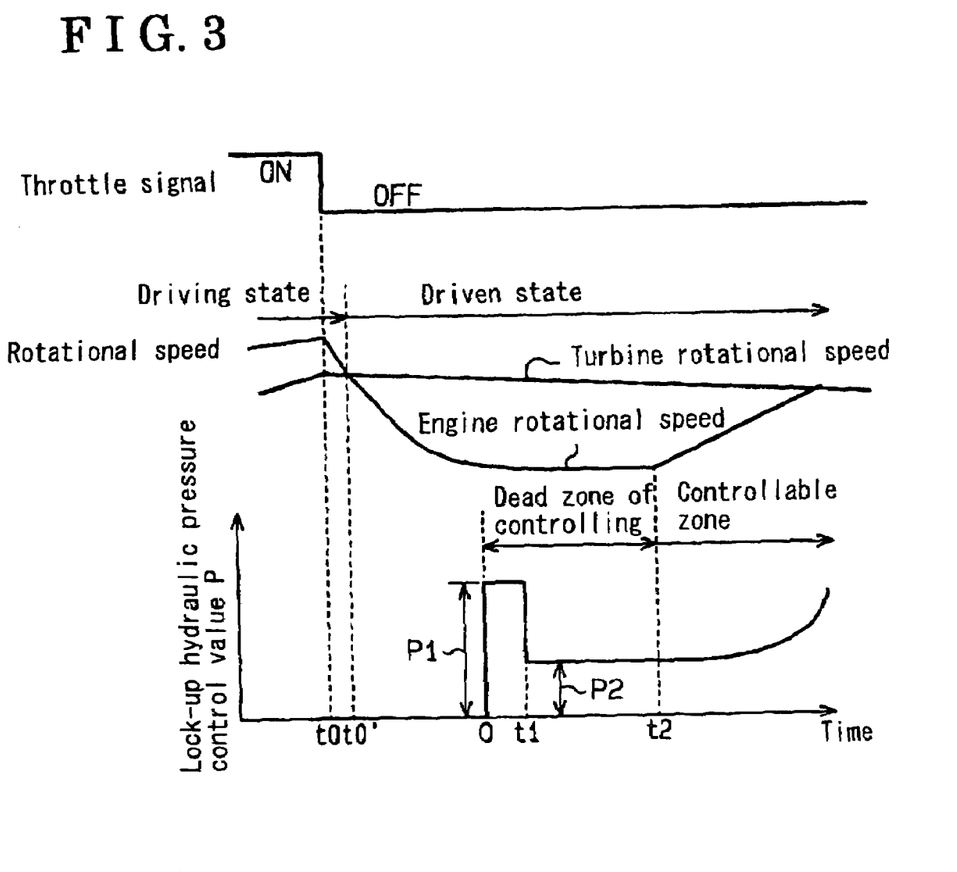
FIG. 3 is a time chart showing controlling process according to a first embodiment of the present invention.

Hereinafter, an example of hydraulic control process will be explained. In this case, the lock-up clutch mechanism 20b is changed from disengaging state to engaging state. FIG. 3 is a time chart showing change of the engine rotational speed Ne, the input shaft rotational speed (the turbine rotational speed) Ni, the lock-up hydraulic pressure control value P in which condition of the throttle signal Th is off (throttle off) involved in non-operating state of the accelerator pedal 11.

As shown in FIG. 3, a situation is considered wherein condition of the accelerator pedal 11 becomes non-operating state, and the throttle signal Th is switched from on to off at a time t0. In this condition, the engine rotational speed Ne begins decreasing, difference between the engine rotational speed Ne and the input shaft rotational speed Ni becomes closer, and condition of the engine 10 is changed from driving state to driven state at a time t0' that the engine rotational speed Ne becomes lower than the input shaft rotational speed Ni.

In accordance with change of engine 10 condition, when a predetermined condition is met, the CPU 51 of the electronic control device 50 starts precharge controlling of hydraulic pressure corresponding to a dead zone of controlling (loss stroke zone) for changing the lock-up clutch mechanism 20b from disengaging state to engaging state at a time 0. The dead zone of controlling is a zone that the lock-up clutch 26 is in non-contacting state and rotational speed of the engine 10 is not changed with starting supplying hydraulic by the third electromagnetic valve 43.

By starting the precharge control, the CPU 51 outputs a control value of a predetermined first output pressure P1 which forms a first period wave form of the lock-up hydraulic pressure control value P for operating the third electromagnetic valve 43 until time becomes t1. This first period is carried out to move the lock-up piston 29 rapidly. Therefore, the first output pressure P1 is set to approximately maximum pressure (line pressure of the hydraulic control circuit 40).

Next, the CPU 51 outputs a control value of a second output pressure P2 which forms a second period wave form of the lock-up hydraulic pressure control value P until time becomes t2. The second output pressure P2 is set to smaller value than the first output pressure P1. This second period is carried out to absorb shock at contacting by restraining the lock-up hydraulic pressure control value P just before the lock-up clutch 29 is switched from discontacting state to contacting state. In addition, the time t2 is a contact timing of the lock-up clutch 26 estimated by the CPU 51 with a process explained later.

Since the time t2 is determined by estimation, the time t2 is not always correspond with actual contact timing of the lock-up clutch 26 (namely, end time of the dead zone of controlling). Although this embodiment will be explained with assuming that the time t2 is equivalent to the actual contact timing of the lock-up clutch 26 for convenience. Until time becomes t2 wherein precharge control of hydraulic pressure ends, the engine rotational speed Ne is still keeping decreasing trend and does not increase since the lock-up clutch 26 remains in discontacting state and the engine 10 is in driven state. After time passes the t2, the CPU 51 starts feedback control of hydraulic pressure corresponding to a controllable zone of the lock-up clutch 26 by contacting. This controllable zone is a zone in which the lock-up clutch is in contacting state and rotational speed of the engine 10 is controllable by means of hydraulic control using the third electromagnetic valve 43. In this condition, the CPU 51 executes known feedback control for the lock-up hydraulic pressure control value P for controlling the third electromagnetic valve 43. Therefore, after time passes t2 (the lock-up clutch becomes contacting state), the engine rotational speed Ne is increased with starting torque transmission from output shaft 32 side (drive wheel side) of the engine 10. In other wards, contact timing of the lockup clutch 26 (switch timing between the dead zone of controlling and the controllable zone) can be estimated by monitoring change of the engine rotational speed Ne in driven state as described above.

Figure 4:
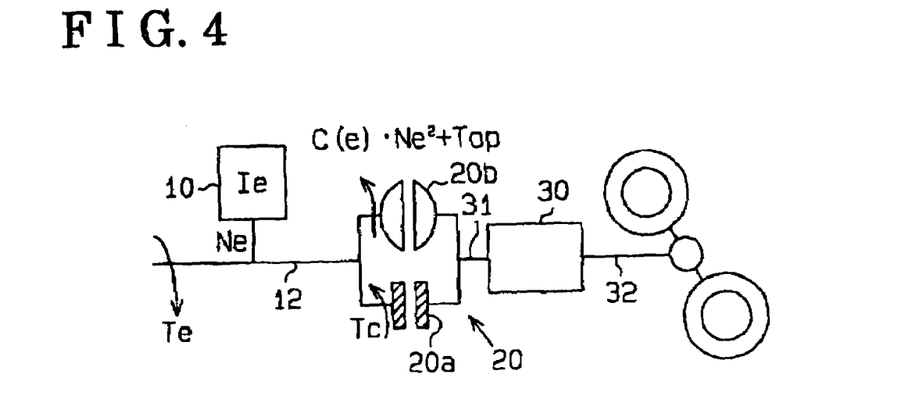
FIG. 4 is a schematic view illustrating a vehicle according to a first embodiment of the present invention.

Next, estimation method of contact shock of the lock-up clutch 26 will be explained. FIG. 4 shows a schematic view of a simplified vehicle. As shown in FIG. 4, Ie corresponds to a moment of inertia of the engine 11 and Te corresponds to an engine torque. In addition, C(e) corresponds to a capacity coefficient of the torque converter 20 which is a function of speed ratio corresponding to a ratio of the input shaft rotational speed (turbine rotational speed) Ni and the engine rotational speed Ne (namely, e=Ni/Ne). In addition, Top corresponds to a loss torque of an oil pump and Tc corresponds to a lock-up clutch torque. According to this vehicle, an equation of motion for the engine 10 may be expressed as an equation (1).

$$Ie \cdot dNe/dt = Te - C(e) \cdot Ne^2 - Top - Tc \quad \text{equation (1).}$$

When the vehicle is in driven state and state of the lock-up clutch mechanism 20b is in a transition period changing from disengaging state (released state) to engaging state, the lock-up clutch torque Tc is zero before contacting of the lock-up clutch 26 and change of the engine rotational speed Ne is little. Therefore, the equation (1) may be expressed as an equation (2).

$$0 = Te - C(e) \cdot Ne^2 - Top \quad \text{equation (2).}$$

In addition, by substituting the equation (2) to the equation (1), an equation (3) may be obtained.

$$Ie \cdot dNe/dt = -Tc \quad \text{equation (3).}$$

The equation (3) indicates that the lock-up clutch torque Tc is in proportion with change of the engine rotational speed (dNe/dt) at transition period of the lock-up clutch mechanism 20b changed from disengaging state (released state) to engaging state in the driven state.

Figure 5A:
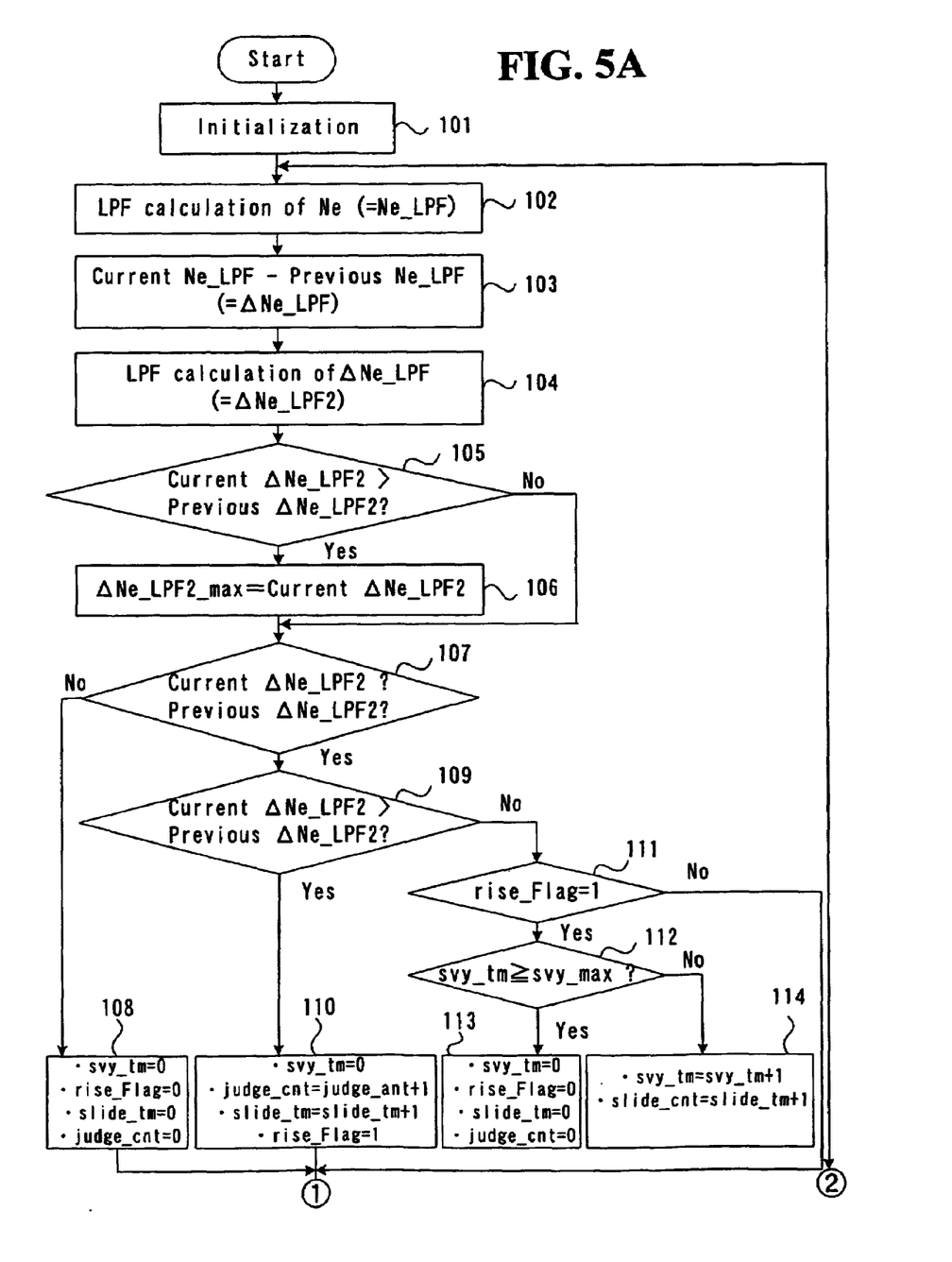
FIGS. 5A and 5B is a flow chart showing a controlling process according to a first embodiment of the present invention.
Figure 5B:
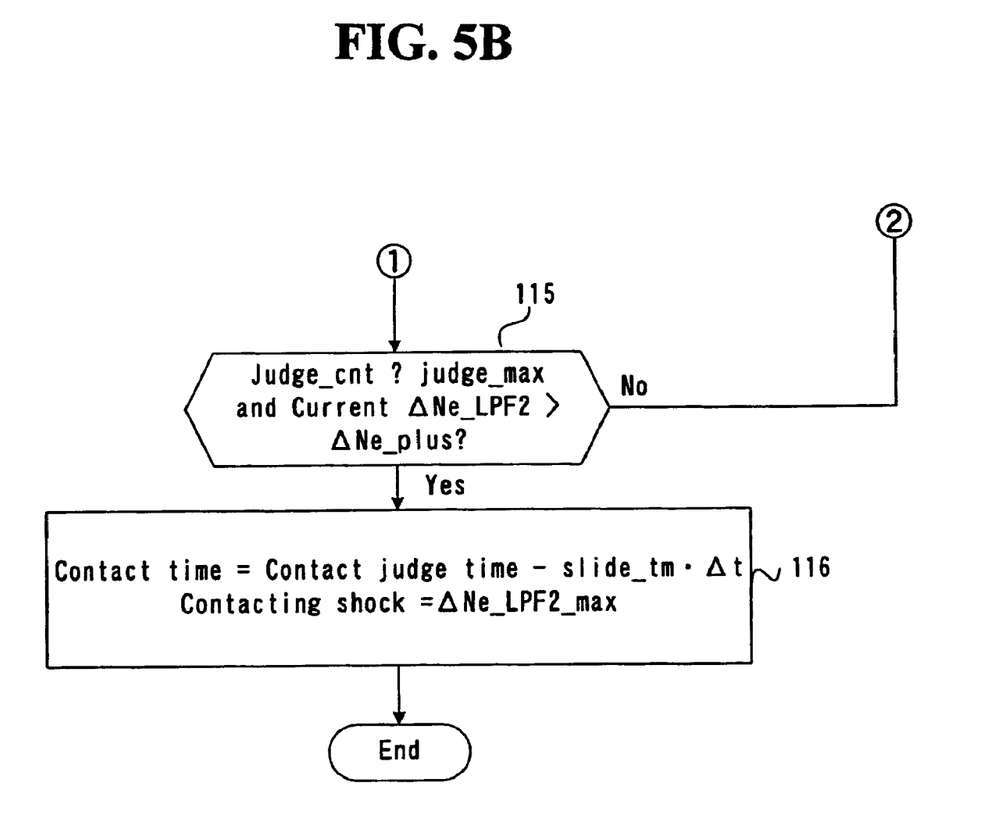
Figure 6:
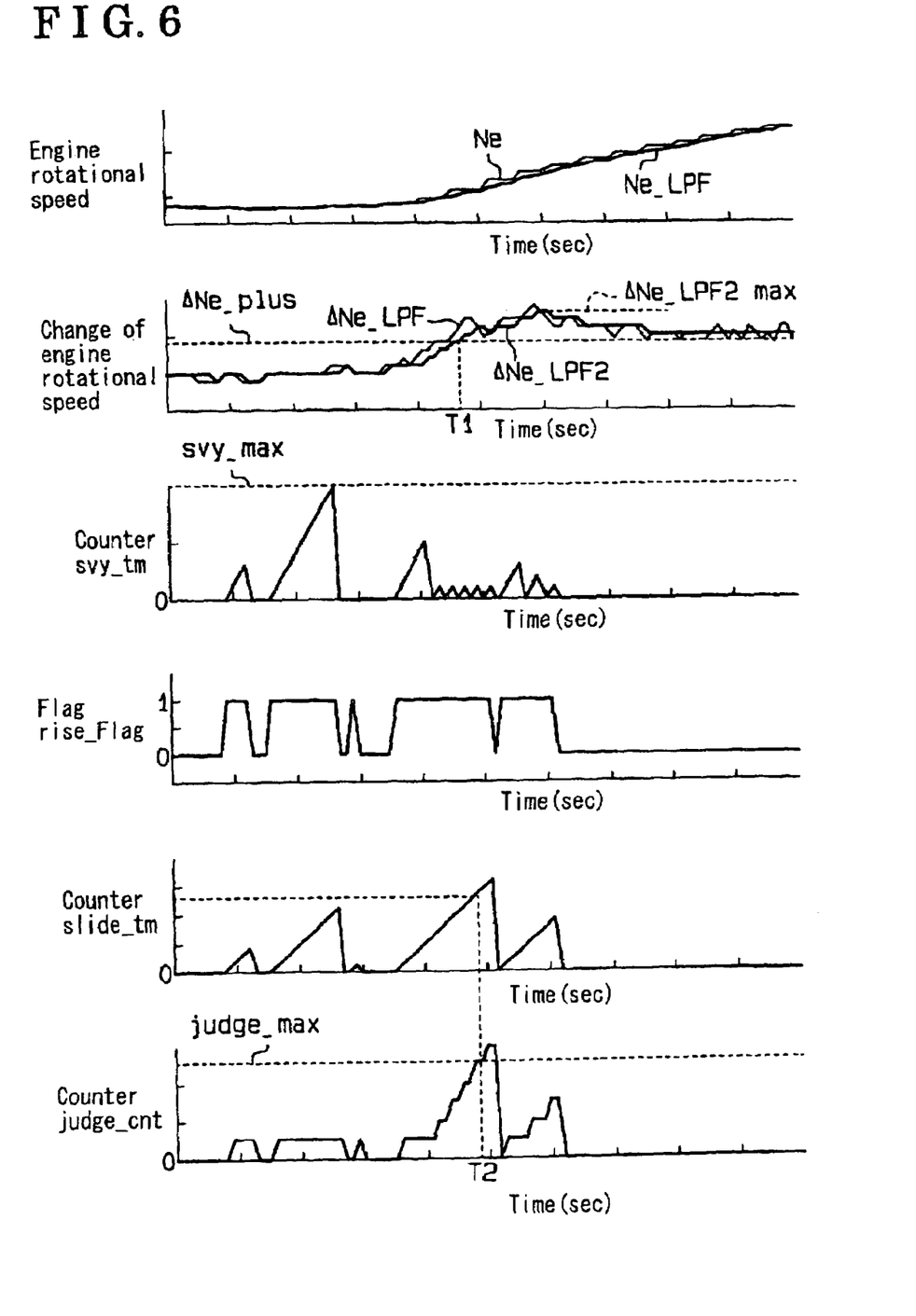
FIG. 6 is a time chart showing operation process according to a first embodiment of the present invention.

Next, an estimation process of contact timing of the lock-up clutch mechanism 26 and contacting shock will be explained with considering the condition at the driven state. FIGS. 5A and 5B and FIG. 6 are a flow chart and a time chart of the calculation process, respectively. Activation condition of the routine is that the throttle signal Th is changed from on to off and condition of the vehicle becomes the driven state after condition of the accelerator pedal 11 is changed to non-operating condition, and precharge control of hydraulic pressure is started to change the lock-up clutch mechanism 20b to engaging condition. This routine is repeated with a predetermined time period Δt. In this condition, the CPU 51 starts counting of time from zero using a timer from start of the precharge control.

After the process proceeds to the routine, the CPU 51 execute initialization for initializing all sorts of data at a step 101, and the process proceeds to a step 102. Then the CPU 51 executes low pass filter calculation to the engine rotational speed Ne for calculating an engine rotational speed low pass filter value Ne_LPF. As shown in FIG. 6, the low pass filter calculation is executed to make the engine rotational speed Ne smooth since the engine rotational speed Ne detected by the engine rotational speed sensor 62 is stepwisely changed.

Next, the CPU 51 calculates an engine rotational speed change ΔNe_LPF which is a difference value of a current engine rotational speed low pass filter value Ne_LPF and a previous engine rotational speed low pass filter value Ne_LPF previously calculated with a fixed time at a step 103, and the process proceeds to a step 104. Then, the CPU 51 calculates an engine rotational speed change low pass filter value ΔNe_LPF2 from the engine rotational speed change ΔNe_LPF. As shown in FIG. 6, the low pass filter calculation is executed to make considerable engine rotational speed change ΔNe_LPF stable.

Then, the CPU 51 judges whether a current engine rotational speed change low pass filter value ΔNe_LPF2 is higher than a previous engine rotational speed change low pass filter value ΔNe_LPF2 at a step 105. If the current engine rotational speed change low pass filter value ΔNe_LPF2 is higher than the previous engine rotational speed change low pass filler value ΔNe_LPF2, the process proceeds to a step 106. Then, a maximum engine rotational speed change ΔNe_LPF2_max is replaced with the current engine rotational speed change low pass filter value ΔNe_LPF2. On the other hand, at the step 105, if the current engine rotational speed change low pass filter value ΔNe_LPF2 is equal to or smaller than the previous engine rotational speed change low pass filter value ΔNe_LPF2, the process proceeds to a step 107. The process included in steps 105–106 is executed to obtain the maximum value of the engine rotational speed change low pass filter value ΔNe_LPF2 (namely, the smoothed engine rotational speed change) while this routine is repeated. In te first embodiment, the maximum engine rotational speed change ΔNe_LPF2_max is an actual calculated value of contacting shock of the lock-up clutch 26 and is in proportion to the change of the engine rotational speed (dNe/dt).

Next, the CPU 51 judges whether the current engine rotational speed change low pass filter value ΔNe_LPF2 is equal to or higher than the previous engine rotational speed change low pass filter value ΔNe_LPF2 at the step 107. If the current engine rotational speed change low pass filter value ΔNe_LPF2 is judged to smaller than the previous engine rotational speed change low pass filter value ΔNe_LPF2, the process proceeds to a step 108 since it corresponds to that the lock-up clutch 26 is not in contacting state. Then the CPU 51 resets a counter svy_tm, a flag rise_flag, a counter slide_tm, and a counter judge_cnt to "0" at the step 108.

The counter svy_tm is a variable for counting calculation time which basically corresponds to a time period that the engine rotational speed change low pass filter value ΔNe_LPF2 is maintained at constant after increasing. This counter svy_tm is reset to "0" when the engine rotational speed change low pass filter value ΔNe_LPF2 is changed or the counter svy_tm reaches a maximum value svy_max. In this case, the counter svy_tm is reset to "0" in response to that the current engine rotational speed change low pass filler value ΔNe_LPF2 is decreased relative to previous value.

Generally, in contacting state of the lock-up clutch 26, the engine rotational speed change low pass filter value ΔNe_LPF2 is not kept constant value for a long stretch. Therefore, the lock-up clutch 26 can be judged to discontacting state when the time period with keeping constant value is sufficiently long. The calculation of the time period described above executed for judging whether the lock-up clutch is in discontacting state.

The flag rise_Flag is set to "1" when the engine rotational speed change low pass filler value ΔNe_LPF2 is increased, and reset to "0" when the engine rotational speed change low pass filter value ΔNe_LPF2 is decreased or the counter svy_tm reaches the maximum value svy_max. In the first embodiment, the flag rise_Flag is reset to "0" in response to that the engine rotational speed change low pass filter value $\Delta Ne\_LPF2$ is decreased relative to previous value.

Generally, in contacting state of the lock-up clutch 26, at least the engine rotational speed change low pass filter value $\Delta Ne\_LPF2$ is not decreased and is not decreased or kept constant value for a long stretch. Therefore, the flag rise_Flag is set to "1" when the lock-up clutch 26 becomes a state which can be judges as in contacting state and set to "0" when the lock-up clutch 26 can be judged as in discontacting state.

The counter slide_tm is a variable for counting calculation time which corresponds to a time period from the flag rise_Flag is set to "1" (namely a time period from the lock-up clutch 26 becomes a state which can be judges as in contacting state). In this embodiment, the counter slide_tm is reset to "0" in response to the flag rise_Flag is set to "0". If contacting state of the lock-up clutch 26 is judged with following method, estimation accuracy of actual contact timing may be improved by subtract a time corresponding to the counter slide_tm (=slide_tm×$\Delta$t) from the judged time.

The counter judge_cnt is a variable for counting calculation time which corresponds to a time period that the engine rotational speed change low pass filter value $\Delta Ne\_LPF2$ is continuously increased. In this embodiment, the counter judge_cnt is reset to "0" in responce to that the engine rotational speed change low pass filter value $\Delta Ne\_LPF2$ is decreassed relative to previous value. To judge the lock-up clutch 26 as contacting state, required conditions are that the counter judge_cnt becomes a value more than a predetermined maximum value judge_max and the engine rotational speed change low pass filter value $\Delta Ne\_LPF2$ becomes a value more than a predetermined value $\Delta Ne\_plus$.

At the step 107, if the current engine rotational speed change low pass filter value $\Delta Ne\_LPF2$ is judged to equal to or higher than the previous engine rotational speed change low pass filter value $\Delta Ne\_LPF2$, the process proceeds to a step 109. Then, the CPU 51 judges whether the current engine rotational speed change low pass filter value $\Delta Ne\_LPF2$ is higher than the previous engine rotational speed change low pass filter value $\Delta Ne\_LPF2$ or not. If the current engine rotational speed change low pass filter value $\Delta Ne\_LPF2$ is judged to higher than the previous engine rotational speed change low pass filter value $\Delta Ne\_LPF2$, the process proceeds to a step 110. At the step 110, the CPU 51 resets the counter svy_tm to "0" and the flag rise_Flag to "1". In addition, the CPU 51 increments the counter slide_tm and the counter judge_cnt (namely, the counter slide_tm and the counter judge_cnt increased "1", respectively).

At the step 109, if the current engine rotational speed change low pass filter value $\Delta Ne\_LPF2$ is judged to smaller than the previous engine rotational speed change low pass filter value $\Delta Ne\_LPF2$ (in other wards, the engine rotational speed change low pass filter value $\Delta Ne\_LPF2$ are equivalent between current value and previous value), the process proceeds to a step 111. Then the CPU 51 judges whether the flag rise_Flag is "1" or not. If the flag rise_Flag is judged to "1", the process proceeds to a step 112 and the CPU 51 judges whether the counter svy_tm is higher than the maximum value svy_max or not. Then, if the counter svy_tm is judged to higher than the maximum value svy_max, the process proceeds to a step 113 since it corresponds to that the lock-up clutch 26 is not in contacting state. At the step 113, the CPU 51 resets the counter svy_tm, the flag rise_flag, the counter slide_tm, and the counter judge_cnt to "0". On the other hand, if the counter svy_tm is judged to equal to or smaller than the maximum value svy_max, the process proceeds to a step 114. At the step 114, the CPU 51 increments the counter svy_tm and the counter slide_tm (namely, the counter svy_tm and the counter slide_tm are increased "1", respectively).

If the flag rise_Flag is judged to not "1" at the step 111 or one of steps 108, 110, 113, 114 has been processed, the process proceeds to a step 115. Then, the CPU 51 judges whether the counter judge_cnt is higher than the predetermined maximum value judge_max and the engine rotational speed change low pass filter value $\Delta Ne\_LPF2$ is higher than a predetermined value $\Delta Ne\_plus$. If the CPU 51 judges these conditions are not met, the process returns to the step 102 followed the next calculation timing (passing of the predetermined time period $\Delta t$) since it corresponds to that the lock-up clutch 26 is not in contacting state.

On the other hand, if the CPU 51 judges these conditions are met, the CPU 51 judges that the lock-up clutch 16 is in contacting state and the time measured by the timer is defined as a judgment time. Then the process proceeds to a step 116. At the step 116, the CPU 51 subtracts the time corresponding to the counter slide_tm (=slide_tm×$\Delta$t) from the judgment time of the contacting state of the lock-up clutch 26 to obtain a contact time of the lock-up clutch 26 (t2) and stores the contact time of the lock-up clutch 26 (t2). The CPU 51 stores the engine rotational speed change low pass filter value $\Delta Ne\_LPF2$ as a maximum engine rotational speed change $\Delta Ne\_LPF2\_max$ corresponding to a contact shock of the lock-up clutch 26 at the step 106. Then, the CPU 51 ends the process.

Next, an example of change of each operational value according to above mentioned process will be supplementary explained with referring to FIG. 6. FIG. 6 shows the engine rotational speed, change of the engine rotational speed (the engine rotational speed change), the counter svy_tm, the flag rise_Frag, the counter slide_tm and the counter judge_cnt. In FIG. 6, starting time (0) of the timer is equivalent to starting time of the precharge control of hydraulic pressure as described.

The first embodiment is used to judge contacting state (contact timing) of the lock-up clutch 26 based on time of continuous increasing of the engine rotational speed change low pass filter value $\Delta Ne\_LPF2$. However, the time of continuous increasing is difficult to count since the engine rotational speed change low pass filter value $\Delta Ne\_LPF2$ may be changed depending on signal noise, disturbance of a vehicle, and the like. Therefore, following process is executed. Namely, time of increasing the engine rotational speed change low pass filter value $\Delta Ne\_LPF2$ is counted by the counter judge_cnt. When the engine rotational speed change low pass filter value $\Delta Ne\_LPF2$ is decreased, the counter judge_cnt is reset to zero and counting is started again. When the engine rotational speed change low pass filter value $\Delta Ne\_LPF2$ is once increased and kept at a constant value (without increasing) for a long stretch, the counter judge_cnt is reset to zero and counting is started again since it corresponds to the lock-up clutch 26 is not in contacting state. To count the time period in which $\Delta Ne\_LPF2$ is kept at a constant value, the counter svy_tm is counted. When the counter svy_tm reaches the maximum value svy_max, the counter svy_tm is reset to zero and counting is started again.

For above conditions, the flag rise_Flag is used to judge whether the counter judge_cnt have to count or reset. When the flag rise_Flag is "1", the counter judge_cnt is counted. As chown in FIG. 6, when the engine rotational speed change low pass filter value $\Delta Ne\_LPF2$ is decreased or the counter svy_tm reaches the maximum value svy_max, the flag rise_Flag is set to "0" and the counter judge_cnt is reset to zero.

As a result of continuous increasing of the engine rotational speed change low pass filter value ΔNe_LPF2, the engine rotational speed change low pass filter value ΔNe_LPF2 exceeds the predetermined value ΔNe_plus at a time T1, and then the counter judge_cnt exceeds the predetermined maximum value judge_max. In this condition, the lock-up clutch 26 is judged to contact state. However, actual contact timing of the lock-up clutch 26 is a starting time of increasing of the engine rotational speed change low pass filter value ΔNe_LPF2. Therefore, the actual contact timing is obtained from the starting time of increasing of the counter slide_tm counted until the lock-up clutch 26 is judged to contact state. In this condition, the counter slide_tm corresponds to the engine rotational speed change low pass filter value ΔNe_LPF2.

Contact shock of the lock-up clutch 26 is estimated as the maximum engine rotational speed change ΔNe_LPF2_max which is the maximum value of the engine rotational speed change low pass filter value ΔNe_LPF2.

Contact timing and contact shock of the lock-up clutch 26 estimated explained above is used to control hydraulic pressure at transition of the lock-up clutch mechanism 20*b* from disengaging state to engaging state in the next lock-up clutch controlling. Specifically, the end time of the precharge control of hydraulic pressure which corresponds to switch timing between the dead zone of controlling and the controllable zone may be precisely estimated. Then, the controlling process may smoothly proceed from the pre-charge control to the feedback control. In addition, by means of adjusting wave form of the lock-up hydraulic pressure control value P for estimating contact shock of the lock-up clutch 26, contact shock may be adequately improved at next time controlling.

According to the first embodiment, the contact timing of the friction material included in the lock-up clutch mechanism is estimated during the driven state based on the engine rotational speed change when condition of the lock-up clutch mechanism is changed from the disengaging state to the engaging state. Since torque is not generally transmitted from the engine during the driven state, the engine rotational speed change is decreased unless the friction material contacts when condition of the lock-up clutch mechanism is changed from the disengaging state to the engaging state. Therefore, by estimating the contact timing of the friction material based on estimation of increasing of the engine rotational speed change with actual contacting of the friction material is detected, the contact timing may be adequately carried out and may not be affected by variation of the engine torque and the torque converter and the like.

According to the first embodiment, the contact timing of the friction material may be estimated by means of a threshold judgment method based on comparison between the change of the engine rotational speed and a predetermined value and comparison between a continuing time period of increasing of the engine rotational speed change and a predetermined time period.

According to the first embodiment, the contact timing of the friction material is estimated from a time calculated by subtracting the continuing time period detected by the continuing time period detection means from a time wherein the engine rotational speed change exceeds the predetermined value and continuing time period of increasing of the engine rotational speed change exceeds the predetermined time period. Therefore, the contact timing may be estimated more precisely by absorbing delay of the judgment from starting increasing of the engine rottional speed change.

According to the first embodiment, error of the estimation of the contact timing may be prevented by estimating that the friction material is not on contact timing when the engine rotational speed change keeps an invariable state with exceeding the predetermined time period.

According to the first embodiment, for example, the engine rotational speed which is changed step-by-step may be smoothed by means of detection of the engine rotational speed through a low pass filter calculation.

According to the first embodiment, the engine rotational speed change may be smoothed by means of detection of the engine rotational speed change through a low pass filter calculation.

(Second Embodiment)

A second embodiment of the present invention is explained referring to FIG. 1, FIG. 2, FIG. 7 and FIG. 8. (In the second embodiment, common numbers and symbols are used for parts having same functions with the first embodiment.)

In the second embodiment, control process of the hydraulic pressure is changed from the first embodiment thereof. Configuration of the vehicle including the engine 10, the torque converter 20 with the lock-up clutch, the automatic transmission 30, the hydraulic pressure control circuit 40, and the electronic control unit (ECU) 50 is basically same as the first embodiment thereof.

Figure 7:
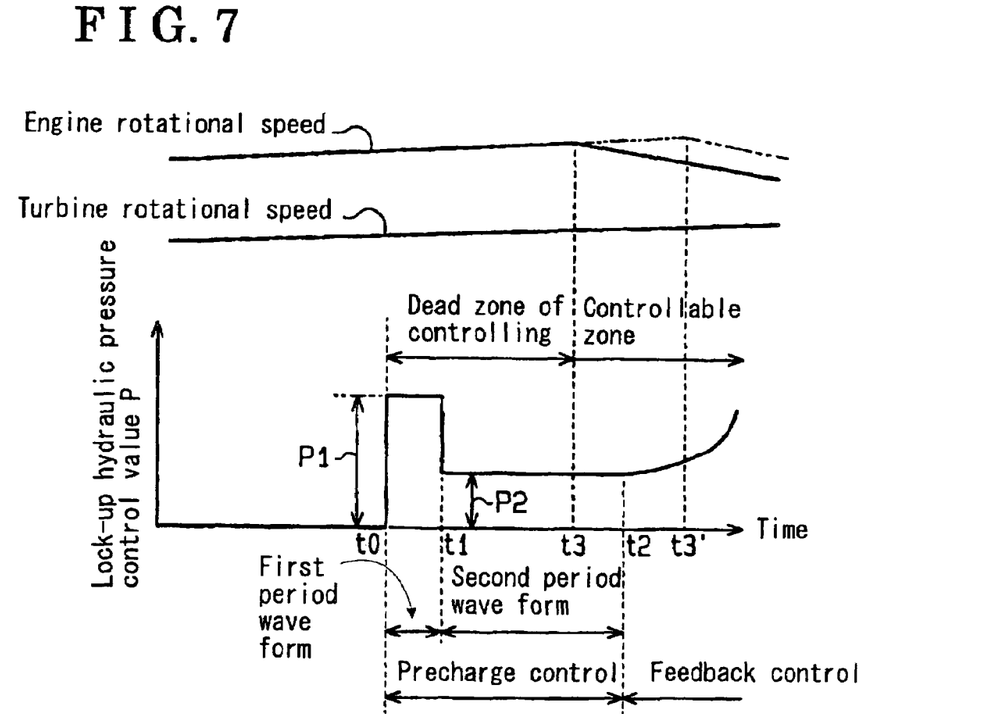
FIG. 7 is a time chart showing a controlling process according to a second embodiment of the present invention.

Hereinafter, another example (second embodiment) of hydraulic control process will be explained. In this case, the lock-up clutch mechanism 20*b* is changed from disengaging state to engaging state. FIG. 7 is a time chart showing change of the engine rotational speed Ne, the input shaft rotational speed (the turbine rotational speed) Ni, the lock-up hydraulic pressure control value P.

As shown in FIG. 7, the CPU 51 of the electronic control unit 50 starts precharge control of hydraulic pressure corresponding to a dead zone of controlling (loss stroke zone) for changing the lock-up mechanism 20*b* from disengaging state to engaging state at a time t0 meeting a predetermined condition. The dead zone of controlling is a zone that the lock-up clutch 26 is in non-contacting state and rotational speed of the engine 10 is not changed with starting supplying hydraulic by the third electromagnetic valve 43.

By starting the precharge control, the CPU 51 outputs a control value of a predetermined first output pressure P1 which forms a first period wave form of the lock-up hydraulic pressure control value P for operating the third electromagnetic valve 43 until time becomes t1. This first period is carried out to move the lock-up piston 29 rapidly. Therefore, the first output pressure P1 is set to approximately maximum pressure (line pressure of the hydraulic control circuit 40).

Next, the CPU 51 outputs a control value of a second output pressure P2 which is adjusted by the CPU 51 with a method explained later and forms a second period wave form of the lock-up hydraulic pressure control value P until time becomes t2. The second output pressure P2 is set to smaller value than the first output pressure P1. This second period is carried out to absorb shock at contacting by restraining the lock-up hydraulic pressure control value P just before the lock-up clutch 29 is switched from discontacting state to contacting state. In addition, the time t2 is a contact timing of the lock-up clutch 26 estimated by the CPU 51 with a process explained later.

In other wards, the lock-up hydraulic pressure control value P is composed of a precharge wave form including the first period wave form with the first output pressure P1 and the second period wave form with the second output pressure P2. In particular, the second output pressure P2 and time period of each the first period wave form and the second period wave form are set by known precharge control wave form learning.

After the CPU 51 ends precharge control of hydraulic pressure at the time t2, the CPU 51 starts feedback control of hydraulic pressure corresponding to a controllable zone of the lock-up clutch 26 by contacting. This controllable one is a zone in which the lock-up clutch is in contacting state and rotational speed of the engine 10 is controllable by means of hydraulic control using the third electromagnetic valve 43. In this condition, the CPU 51 executes known feedback control for the lock-up hydraulic pressure control value P for controlling the third electromagnetic valve 43. Then, the lock-up hydraulic pressure control value P is gradually increased after the time t2.

In the second embodiment, the control process is essentially constructed that the lock-up clutch 26 is contacted while a time period (between t1 and t2, wherein the second wave form is set in precharge control) and changed from the dead zone of controlling to the controllable zone. This process is executed to quantitatively estimate adjusting degree of the second output pressure P2 by means of known learning method of the precharge control wave form. In the learning process. Contact shock at switching of state of the lock-up clutch 26 from discontacting state to contacting state may become constant independent of contact timing by setting a pressure at switching of state of the lock-up clutch 26 from discontacting state to contacting state (the second output pressure P2) constant. FIG. 7 shows an example of switching from dead zone of controlling to controllable zone at a time t3 which is a period wherein the second period wave form is set in precharge control.

On the other hand, if the second output pressure P2 is insufficient value (low value) in learning of precharge wave form, the lock-up piston 29 may be returned the time period for setting the second period wave form (the time between t1 and t2). In this condition, switching from the dead zone of controlling to the controllable zone (contacting of the lock-up clutch 26) is not carried out by the end time of precharge control (t2) and the process proceeds to feedback control. An example that switching from the dead zone of controlling to the controllable zone is carried out at a time t3' (after proceeding the process to feedback control) is additionally shown as a two-dot chain line. From this condition, as explained below, the CPU 51 adjusts the second output pressure P2 to increase as explained below. Then the adjusted second output pressure P2 is applied to the second wave form at next precharge control to make the lock-up clutch 26 contact.

When switching is carried out from the dead zone of controlling to the controllable zone, the engine rotational speed Ne starts decreasing by means of hydraulic pressure supplied to the lock-up clutch mechanism 20b, and difference between the engine rotational speed Ne and the input shaft rotational speed (the turbine rotational speed) Ni is decreased. The CPU 51 detects switching timing from the dead zone of controlling to the controllable zone (namely, contact timing of the lock-up clutch 26).

Figure 8:
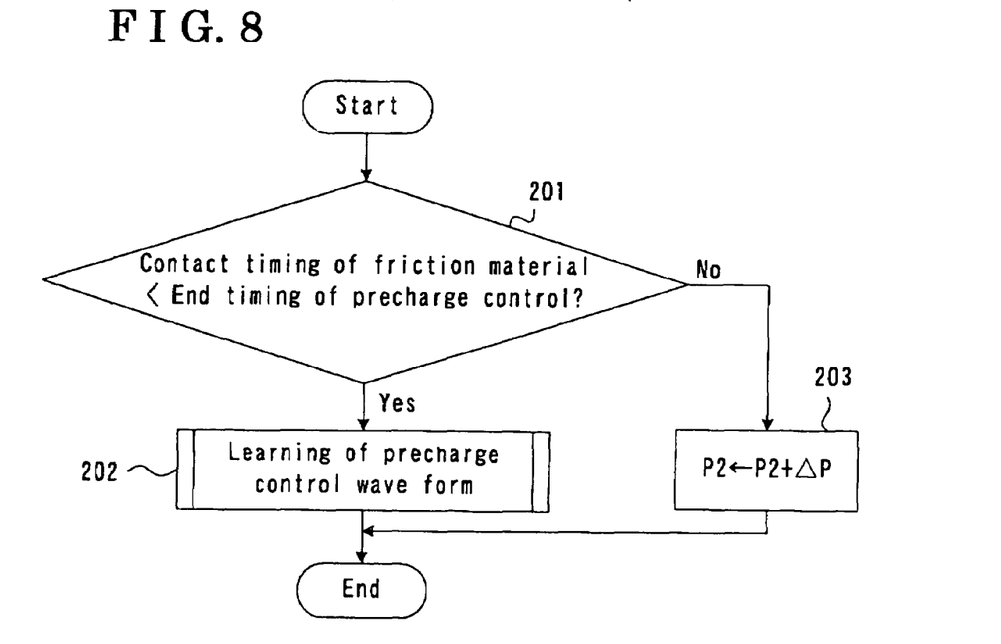
FIG. 8 is a flow chart showing controlling process according to a second embodiment of the present invention.

Next, an estimation process of the precharge wave form will be explained as an example of lock-up control according to the second embodiment with referring a flow chart shown in FIG. 8. This routine is started when an activation condition is satisfied (namely, the engine rotational speed Ne and the input shaft rotational speed Ni are matched each other, and lock-up operation is judged to be end state).

After the process proceeds to the routine, the CPU 51 judges whether the contact timing (t3) of the lock-up clutch 26 is earlier than the end timing of precharge control (t2) at previous lock-up operation at a step 201. Then, if the contact timing (t3) of the lock-up clutch 26 (contact timing of friction material) is judged to be earlier than the end timing of precharge control (t3) at previous lock-up operation, the process proceeds to a step 202 and the CPU 51 executes learning of the precharge control wave form. In concrete terms, the CPU 51 estimates contact shock of the lock-up clutch 26 by means of known method based on change of the engine rotational speed or lock-up clutch torque, then executes learning of precharge control based on estimated contact shock. In this manner, for example, the second output pressure P2 and the time period of the second period wave form are learned and adjusted. The CPU 51 ends the process after learning of the precharge control wave form is carried out.

On the other hand, at the step 201, if the contact timing (t3) of the lock-up clutch 26 (contact timing of friction material) is judged to be not earlier than the end timing of precharge control (t2) at previous lock-up operation, the process proceeds to a step 203. Then, the CPU 51 replaces the second output pressure P2 with a sum of current second output pressure P2 and a predetermined pressure $\Delta P$ and ends the process.

According to the second embodiment, response speed of the lock-up piston 29 may be increased depending on the predetermined pressure $\Delta P$ which is added to the second output pressure P2, then the lock-up clutch 26 may contact during precharge controlling in the next lock-up operation. In this manner, contacting shock may be estimated and learning of precharge control may be achieved.

According to the second embodiment, the second period wave form of the precharge wave form may be kept at a constant value. Therefore, the contact shock at contacting of the friction material may not be affected by contact timing of the friction material during precharge controlling. The precharge wave form may be adequately learned without considering change of the contact shock with change of the contact timing of the friction material.

According to the second embodiment, when the friction material becomes contacting state after the end time of the precharge control (namely, when the supplied hydraulic pressure to the loss stroke is insufficient), the learning control of the precharge control is stopped and the constant value set to the second period wave form is incrementally adjusted. Therefore, the learning control of the precharge wave form may be restarted by eliminating delay of the contact timing of the friction material to stopping timing of the precharge control.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A lock-up clutch control device for controlling a lock-up clutch mechanism provided to a torque converter comprising:
    an estimation means for estimating a contact timing of a friction material included in the lock-up clutch mechanism during a driven state based on an engine rotational speed change when condition of the lock-up clutch mechanism is changed from a disengaging state to an engaging state; and
    a precharge control means for executing a precharge control of supplying hydraulic pressure for controlling movement of a lock-up piston by outputting a precharge wave form including a first period wave form set to the vicinity of a maximum value and a second period wave form set to a smaller value than the value of the first period wave form and a learning control means for controlling the precharge wave form based on a contacting shock of the friction material calculated from the engine rotational speed change, where the second period wave form of the precharge wave form is kept at a constant value.

2. A lock-up clutch control device according to claim 1, further comprising an adjusting means for incremental adjusting of the constant value set to the second period wave form after stopping the learning control of the precharge control when the friction material becomes a contacting state after an end time of the precharge control.

3. A lock-up clutch control device for controlling a lock-up clutch mechanism provided to a torque converter, comprising:
    an engine rotational speed detection means for detecting an engine rotational speed;
    a turbine rotational speed detection means for detecting a turbine rotational speed;
    a condition detection means for detecting a driven state based on the detected engine rotational speed and the turbine rotational speed;
    an engine rotational speed change detection means for detecting an engine rotational speed change based on the detected engine rotational speed;
    an estimation means for estimating a contact timing of a friction material included in the lock-up clutch mechanism during the driven state based on the engine rotational speed change when a condition of the lock-up clutch mechanism is chanced from a disengaging state to an engaging state; and
    wherein the estimation means estimates the contact timing of the friction material based on comparison between the change of the engine rotational speed and a predetermined value and comparison between a continuing time period of increasing of the engine rotational speed change and a predetermined time period.

4. A lock-up clutch control device according to claim 3, further comprising a continuing time period detection means for detecting the continuing time period of nondecreasing of the engine rotational speed change, wherein the estimation means estimates the contact timing of the friction material from a time calculated by subtracting the continuing time period detected by the continuing time period detection means from a time wherein the engine rotational speed change exceeds the predetermined value and continuing time period of increasing of the engine rotational speed change exceeds the predetermined time period.

5. A lock-up clutch control device according to claim 3, wherein the estimation means estimates that the friction material is not on contact timing when the engine rotational speed change keeps an invariable state with exceeding the predetermined time period.

6. A lock-up clutch control device according to claim 4, wherein the estimation means estimates that the friction material is not on contact timing when the engine rotational speed change keeps an invariable state with exceeding the predetermined time period.

7. A lock-up clutch control device according to claim 3, wherein the engine rotational speed detection means detects the engine rotational speed through a low pass filter calculation.

8. A lock-up clutch control device according to claim 5, wherein the engine rotational speed detection means detects the engine rotational speed through a first low pass filter calculation.

9. A lock-up clutch control device according to claim 6, wherein the engine rotational speed detection means detects the engine rotational speed through a first low pass filter calculation.

10. A lock-up clutch control device according to claim 8, wherein the change of the engine rotational speed detection means detects the engine rotational speed change through a second low pass filter calculation.

11. A lock-up clutch control device according to claim 9, wherein the change of the engine rotational speed detection means detects the engine rotational speed change through a second low pass filter calculation.

12. A lock-up clutch control device according to claim 3, further comprising a precharge control means for executing a precharge control of supplying hydraulic pressure for controlling movement of a lock-up piston by outputting a precharge wave form including a first period wave form set to the vicinity of a maximum value and a second period wave form set to a smaller value than the value of the first period wave form and a learning control means for controlling the precharge wave form based on a contacting shock of the friction material calculated from the engine rotational speed change, where the second period wave form of the precharge wave form is kept at a constant value.

13. A lock-up clutch control device according to claim 4, further comprising a precharge control means for executing a precharge control of supplying hydraulic pressure for controlling movement of a lock-up piston by outputting a precharge wave form including a first period wave form set to the vicinity of a maximum value and a second period wave form set to a smaller value than the value of the first period wave form and a learning control means for controlling the precharge wave form based on a contacting shock of the friction material calculated from the engine rotational speed change, where the second period wave form of the precharge wave form is kept at a constant value.

14. A lock-up clutch control device according to claim 12, further comprising an adjusting means for incremental adjusting of the constant value set to the second period wave form after stopping the learning control of the precharge control when the friction material becomes a contacting state after an end time of the precharge control.

15. A lock-up clutch control device for controlling a lock-up clutch mechanism provided to a torque converter comprising:
    an engine rotational speed detection means for detecting an engine rotational speed;
    a turbine rotational speed detection means for detecting a turbine rotational speed;

a condition detection means for detecting a driven state based on the detected engine rotational speed and the turbine rotational speed;

an engine rotational speed change detection means for detecting an engine rotational speed change based on the detected engine rotational speed;

an estimation means for estimating a contact timing of a friction material included in the lock-up clutch mechanism during the driven state based on the engine rotational speed change when a condition of the lock-up clutch mechanism is changed from a disengaging state to an engaging state; and a precharge control means for executing a precharge control of supplying hydraulic pressure for controlling movement of a lock-up piston by outputting a precharge wave form including a first period wave form set to the vicinity of a maximum value and a second period wave form set to smaller value than the value of the first period wave form and a learning control means for controlling the precharge wave form based on a contacting shock of the friction material calculated from the engine rotational speed change, where the second period wave form of the precharge wave form is kept at a constant value.

16. A lock-up clutch control device according to claim 15, further comprising an adjusting means for incremental adjusting of the constant value set to the second period wave form after stopping the learning control of the precharge control when the friction material becomes a contacting state after an end time of the precharge control.

* * * * *